Patented June 26, 1934

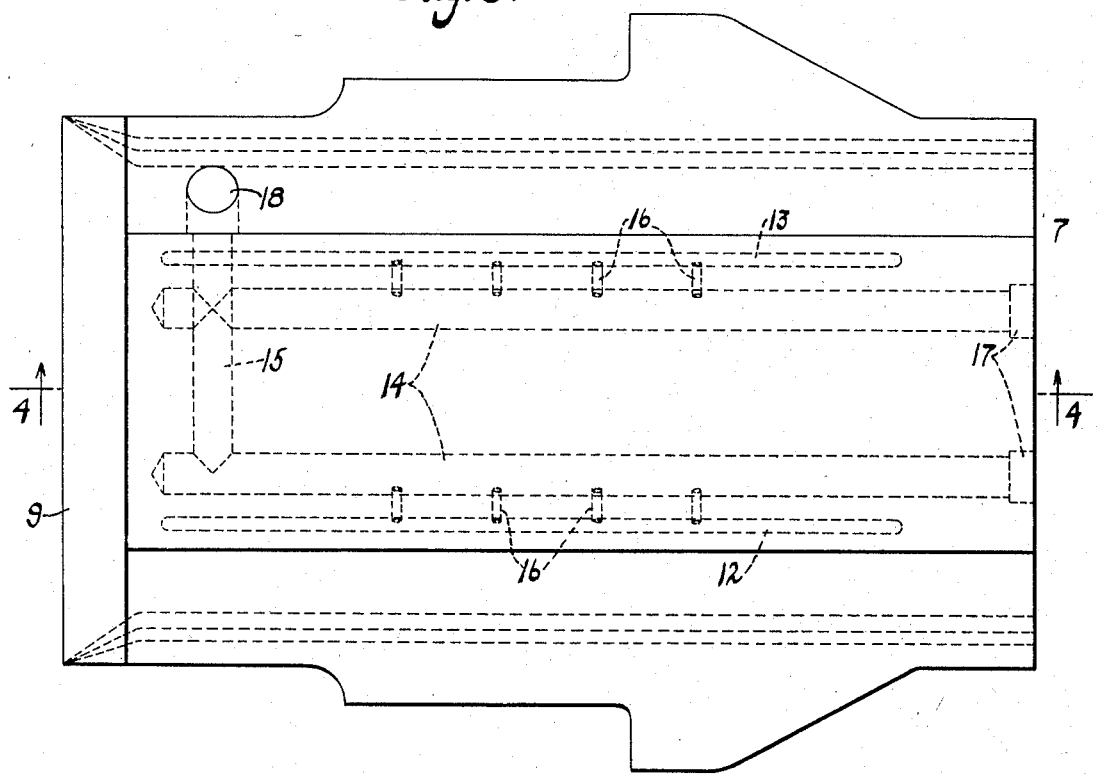
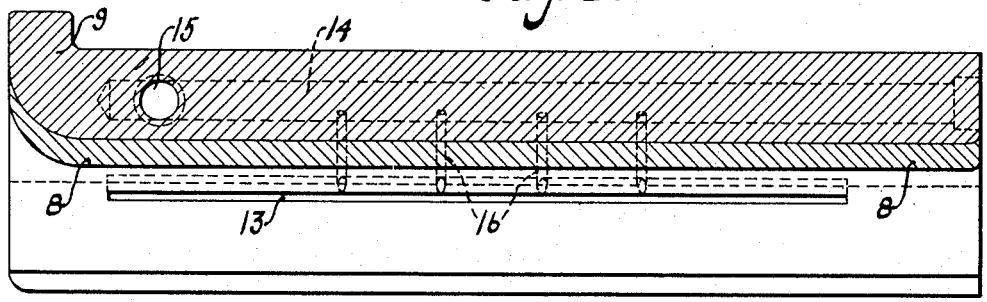

1,964,688

UNITED STATES PATENT OFFICE 1,964,688

JOURNAL BEARING LUBRICATION

Edwin S. Pearce, Indianapolis, Ind.

Application April 27, 1931, Serial No. 533,014

14 Claims. (Cl. 308—79)

This invention relates to the lubrication of journal bearings, such as vehicle axle journal bearings of railway rolling stock. The invention aims at improved lubrication and reduced friction and wear, as well as avoidance of heating. It can be embodied in bearings interchangeable with standard bearings now in use; and it can also be applied to existing bearings already in use, at comparatively small cost and without prolonged withdrawal from service. Other objects and advantages that can be realized in connection with the invention will appear from the description hereinafter.

In the drawings:

Fig. 3 is a plan view of the bearing.

Fig. 4 shows a vertical longitudinal axial section through the bearing, taken on the line 4—4 of Fig. 3.

Figure 1:
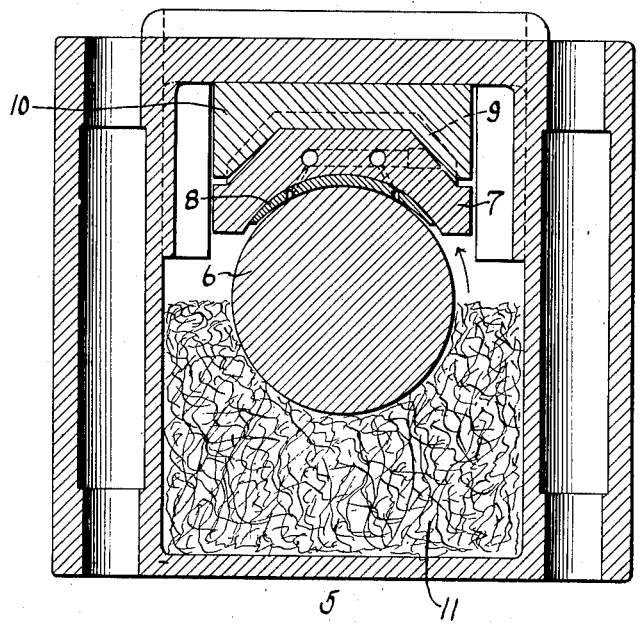
Fig. 1 shows a vertical section through a railway journal box with its bearing and axle, etc., taken perpendicular to the axle.

Fig. 1 shows a railway journal box 5 of an ordinary construction, with the journal portion of a car axle 6; a bearing 7 having a babbitt or other anti-friction surfacing 8 and an upstanding flange 9 at its back or inner end; and a saddle member 10 interposed between the bearing 7 and the top of the box 5. The contour of the bearing surface is such as to provide a small space $x$ at each side of the center as shown best in Fig. 2. In the "cellar" of the box 5, below the axle journal 6, is the usual waste or other absorbent 11, saturated with lubricant oil. As the axle journal 6 revolves (clockwise or counter-clockwise, according to the direction of movement of the vehicle), it takes oil from the waste 11 in contact with it and carries this oil up to and under the bearing surface, thus lubricating its contact with the journal. After the parts have been running long enough, there is a film of oil between the journal 6 and the bearing 7.

However, when the parts are stationary for awhile after a period of running, the oil is squeezed out from between the journal 6 and the bearing 7, so that there is direct metallic contact or clinging between them. The more perfect the conformity of the bearing 7 to the journal 6, the greater the area of metallic contact. When, therefore, rotation is resumed or started, the initial relative movement of the surfaces is unlubricated (or but very poorly lubricated) until the oil picked up by the journal 6 and carried up to the bearing 7 works its way in between them. It is desirable that metallic contact be changed to lubricated contact as quickly and at as low a speed as possible.

It is well known, in railroad operations, that "hot boxes" occur at low speeds rather than at high speeds, and usually after stops have been made,—owing, probably, to the breakage of the oil film during stops, and the delay in restoring it.

Referring now, to the side of the journal 6 that is moving upward toward and under the bearing 7 as the "inbound" side, and to the other side as the "outbound" side, it has been determined that while there is oil on the inbound side of the journal, there is little or no evidence of oil on the outbound side; showing that there is no significant flow of oil into or under one side of the bearing 7 and out at the other side. And while there is pressure in the clearance or oil film at the inbound side of the journal 6, there is a vacuum at the outbound side, which also shows that little oil passes the peak or center of the bearing pressure on the top of the journal.

In the main, the circulation of oil from the supply at 11 to the bearing surfaces and back again consists in raising the oil at the inbound side of the journal 6 to and under the inbound side of the bearing 7, and in scraping it off so that it falls back at the same side of the journal 6,—to be raised again, etc. With fibrous material such as waste to hold the oil, as shown in Fig. 1, the waste soon becomes supersaturated at the inbound side of the journal box 5, and dry at the outbound side. When, therefore, the direction of movement is reversed after running some time in one direction, a certain interval of time must elapse before the concentration of oil in the waste at 11 is reversed, so as to afford favorable conditions for lubrication of the bearing 7. During this interval there is greater friction and heat in the journal than in normal running, after conditions have become stabilized.

While the temperature of the journal 6 and bearing 7 may be as high as 200–300° F., that of the supply of lubricating medium (waste and oil) at 11 is not much above the ordinary atmospheric temperature of about 60–80° F. If, therefore, the viscosity of the oil is suitable for lubrication at the journal and bearing temperature, it is too great for rapid circulation in the supply 11. And there is no adequate circulation of the oil in such wise as to absorb heat from bearing 7 and journal 6 and carry it to the waste 11.

Another unfavorable condition is lack of uniformity in the supply and distribution of oil lengthwise (in an axial direction) of journal 6 and bearing 7. The contact of the waste 11 with the journal 6 is not uniform, and the feed of oil through the waste is not uniform. The wiping and scraping action of the bearing 7 on the journal 6 does not distribute the oil lengthwise of journal and bearing to any adequate degree.

I have found that these and other drawbacks of present lubrication can be overcome by methods and arrangements which can best be explained after description of one suitable form of construction, such as shown in the drawings.

Figure 2:
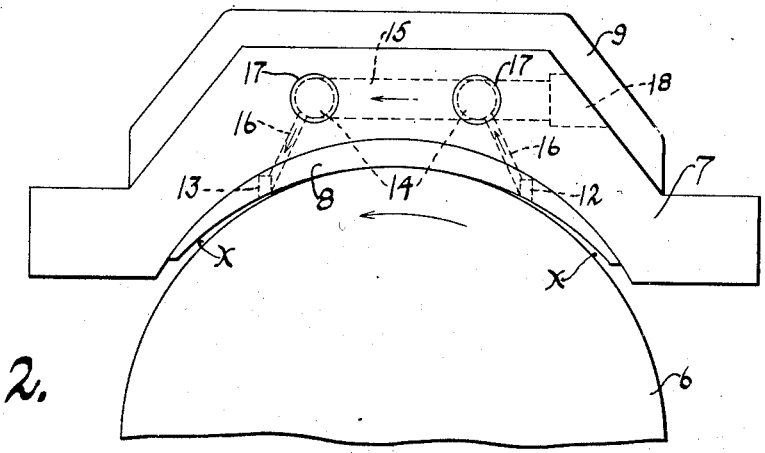
Fig. 2 is a fragmentary end view of the axle and the bearing, on a larger scale than Fig. 1.

As shown in Figs. 1, 2 and 3, channels in the form of grooves or slots 12, 13 are provided in the contact surface of the bearing 7, extending lengthwise or axially at opposite sides of the peak or center of bearing pressure, and in the present instance equidistant from the center line of the bearing and parallel therewith and at a point where they will be in free communication with the spaces $x$. Passage for the transmission of oil between these channels 12, 13 is provided, preferably behind the bearing or contact surface. For this purpose, there are shown longitudinal ducts or channels 14, 14 in the bearing 7, communicating with one another by a cross-duct or channel 15, and each communicating with one of the channels 12, 13 by lateral ducts or channels 16. This arrangement of separate parallel longitudinal ducts 14, 14 may generally be preferred to a single such duct connected to both of the channels 12, 13 by lateral ducts, on account of greater difficulties of manufacture involved in the latter arrangement.

In Figs. 2, 3 and 4, the ducts 14, 14 are shown as round holes drilled from the front end of the bearing 7 almost (but not quite) to its back end; and the cross duct is shown as an intersecting hole drilled from one side of the bearing 7; while the lateral ducts 16 are shown as drilled upwardly from the channel grooves 12, 13. As shown in Fig. 2, the outer ends of the holes forming the ducts 14, 14 and 15 are closed by plugs 17, 17 and 18, so that there is no escape for oil from the circulatory system formed by the ducts 14, 14, 15 and 16.

With the journal 6 turning counter-clockwise, as indicated by the arrows in Figs. 1 and 2, the oil carried up by the journal under the inbound side of the bearing 7 is forced into the groove 12. When the oil thus collected has filled the groove 12, it begins to flow through the ducts 16 into the corresponding longitudinal duct 14, and then through this duct 14, through the cross duct 15, through the other longitudinal duct 14, and through ducts 16 into the other groove 13 in the contact surface of the bearing 7, whence it flows out between the bearing and the journal 6. The circulation is due to two forces: first, the pressure created at the inbound side of the journal 6; and second, the vacuum or suction at the outbound side.

As a result of the flow of oil as just described, there is a wiping vein of oil in the groove 13, discharging on the outbound side of the journal 6 and distributing oil uniformly over the surface: this is verified by the presence of oil on the descending outbound side of the journal 6, below the bearing 7. There is a film of oil from 12 to 13, and, indeed, over practically the entire contact area of the bearing 7 on the journal 6. And there is a thorough and considerable circulation or flow of oil, not merely through the clearance between the contact surfaces and through the passages 16, 14, 15, 14, 16, but from the waste 11 at the inbound side up to and through the bearing and down again to the waste 11 at the outbound side. The oil is better distributed lengthwise of the journal 6, both in the bearing and in the waste 11. The waste 11 is equally saturated with oil at the two sides of the journal 6, and the temperature is better equalized as between the journal 6 and bearing 7 and the waste, because of the freer and more extended circulation of the oil and its flow through the passages in the bearing 6. Owing to the definite circumferential flow of the oil around the journal 6, there is much less end leakage and loss of oil by working out at the ends of the bearing 7.

When rotation of the journal 6 is reversed, the conditions of pressure and suction or vacuum are reversed as between the two sides of the journal 6 and the two grooves 12, 13, so that the circulation of oil is at once reversed. This, however, does not impair the lubrication, even temporarily; because the waste 11 is equally saturated with oil at the two sides of the journal 6. When rotation stops, the store of oil above the journal 6 (in the passages of the bearing 7) remains instantly available for lubrication the moment rotation (either way) is resumed; and the more the bearing 7 "clings" to the journal 6 when at rest, on squeezing out the oil film between them, the more effectually the passages or ducts are sealed against leakage-loss of oil. If the journal 6 momentarily loses contact with the bearing 7, owing to uneven track, the journal is at once flooded with oil from the storage reservoir afforded by the bearing passages or chambers 14, 15, 14, etc., so that a hot box can hardly result, as is often the case in present bearings.

Hot boxes are also supposed to arise from lint or short fibers from the waste 11 getting in between the journal 6 and the bearing surface of the bearing 7, and working up toward the crest or center of bearing pressure. In a bearing constructed as here indicated, however, such lint or fibers are caught and either held in the groove 12 or washed clear through into the groove 13 and carried on back to the waste 11, without any opportunity of working up to the crest of bearing pressure.

It will be seen, therefore, that the advantages which I have explained result mainly from certain distinctive features of operation, including especially the collection and storage of oil from the journal 6, for return directly to the contact area when required; the transmission or by-passing of oil from the inbound side of the journal 6 to its outbound side; the circulation of oil through the bearing 7 itself, so as to absorb heat better, as well as circumferentially between journal 6 and bearing 7; the more uniform lengthwise distribution of oil; and the circulation of oil from the inbound side of the supply 11 to its outbound side, up, over the journal 6, and down again. Obviously, some or all of these features can be realized in a great variety of constructions within the spirit of my invention.

I claim:—

1. A journal bearing of the character described having axially extending grooves in its bearing surface at opposite sides of the crest, longitudinal ducts formed in said bearing, a cross duct formed in said bearing connecting said longitudinal ducts, means closing the ends of the aforesaid ducts, and ducts extending from said grooves into said longitudinal ducts.

2. In a railway vehicle journal bearing of the type where lubricant is carried upwardly by the surface of the journal to the crown bearing which receives and transmits the load to the journal, the combination of an axially extending groove in the bearing surface at each side of the crest, and otherwise entirely closed passage means connecting said grooves.

3. In a journal bearing of the type where lubricant is carried upwardly by the surface of the journal to the crown bearing which receives the load, the combination of an axially extending groove in the bearing surface at each side of the crest, said grooves terminating short of the ends of the bearing, lubricant storage channels in the bearing, and a series of relatively small capacity circulating ducts connecting said channels with said grooves, said storage channels and said ducts being otherwise entirely closed.

4. In a journal bearing of the type where lubricant is carried upwardly by the surface of the journal to the crown bearing which receives the load, the combination of an axially extending groove in the bearing surface at each side of the crest, said grooves terminating short of the ends of the bearing, and otherwise closed passage means connecting said grooves, said grooves being sealed to the atmosphere when the journal stops rotating and said connecting passage means being of a size or capacity of such nature as to constitute it an oil reservoir and, further, said connecting passage means being formed to permit the creation of a vacuum on the outbound side of the journal.

5. A journal bearing of the character described having an axially extending groove in the bearing surface at each side of the crest, a longitudinal oil storage channel for each groove, a cross channel connecting said longitudinal channels, and a plurality of relatively small capacity longitudinally spaced circulating ducts connecting each groove with its channel, all of said grooves, channels and ducts constituting a closed oil circulating circuit which extends from one side of the bearing to the other.

6. In a railway vehicle journal bearing of the type where lubricant is carried upwardly by the surface of the journal to the crown bearing which receives and transmits the load to the bearing, the combination of an axially extending groove in the bearing surface at each side of the crest, and passage means connecting said grooves, said passage means being closed except for its connection to said grooves so as to utilize the vacuum created at the outbound side as an aid in drawing the lubricant through said passage means from the inbound side to be delivered to the journal at the groove on the outbound side thereof.

7. The combination of a railway vehicle journal, a journal box containing lubricant and waste, a journal bearing which receives and transmits the load to the journal, and lubricant circulating passage means having an opening adjacent the journal at each side of the center of bearing pressure, said passage means being otherwise closed and constructed and arranged so as to utilize the vacuum created between the bearing and the journal at the outbound side as an aid in establishing a circulation of lubricant from the opening on the inbound side to the opening on the outbound side whereby more uniform temperature conditions will exist as between the bearing and the waste.

8. In a railway vehicle journal bearing of the type where lubricant is carried upwardly by the surface of the journal to the crown bearing which receives and transmits the load to the journal, the combination of an oil slot in the bearing surface at each side of the crest, and passage means connecting said slots, said passage means being otherwise closed so as to utilize the vacuum created at the outbound side as an aid in drawing the lubricant through said passage means from the inbound side to be delivered to the journal at the slot on the outbound side and said passage means being of a size or capacity of such nature as to constitute it an oil reservoir.

9. The combination of a railway vehicle journal, a bearing which receives and transmits the load to the journal, said bearing forming a wedge space between the inner face of the bearing and the adjacent surface of the journal at each side of the crest of the bearing, a lubricating slot in the bearing surface at each side of the crest communicating with such wedge space, the bearing area between said lubricating slots being substantially uninterrupted, and passage means connecting said slots, said passage means being otherwise closed so as to utilize the vacuum created at the wedge space on the outbound side as an aid in drawing the lubricant through said passage means from the inbound side to be delivered to the journal at the slot on the outbound side.

10. The combination of a railway vehicle journal, a bearing which receives and transmits the load to the journal, said bearing forming a wedge space between the inner face of the bearing and the adjacent surface of the journal at each side of the crest of the bearing, a slot in the bearing surface at each side of the crest communicating with such wedge space, and otherwise entirely closed passage means connecting said slots.

11. A railway vehicle journal bearing having an axially extending groove in its journal face at each side of the crest, passage means connecting said grooves, said passage means being closed except for its connection to said grooves, and means for delivering lubricant to the surface of the journal at a point to the outside of said grooves.

12. In a railway vehicle journal bearing of the type where lubricant is carried upwardly by the surface of the journal to a crown bearing which receives and transmits the load to the journal, the combination of a crown bearing providing a wedge space at each side of the crest, and lubricant circulating means connecting said wedge spaces, said circulating means being constructed and arranged so as to constitute a closed passageway connecting the wedge spaces whereby to utilize the vacuum created on the outbound side during rotation of the journal as an aid in circulating lubricant through said passageway from the inbound side to the outbound side.

13. In a railway vehicle journal bearing of the type where lubricant is carried upwardly by the surface of the journal to the crown bearing which receives and transmits the load to the journal, the combination of an axially extending oil slot in the bearing surface at each side of the crest, said slots being closed at their ends, and oil circulating passage means connecting said slots, said passage means being constructed and arranged as a closed cross connection whereby to prevent escape of circulating oil and utilize the vacuum created between the bearing and the journal at the outbound side as an aid in circulating lubricant from the slot on the inbound side to the slot on the outbound side.

14. In a railway vehicle journal bearing of the type where lubricant is carried upwardly by the surface of the journal to a crown bearing which receives and transmits the load to the journal, the combination of a crown bearing providing a wedge space at each side of the crest, an axially extending oil slot in the bearing surface at each side of the crest communicating with its respective wedge space, said slots being closed at their ends, and oil circulating passage means connecting said slots, said passage means being constructed and arranged as a closed connection whereby to prevent escape of circulating oil and utilize the vacuum created between the bearing and the journal at the outbound side as an aid in circulating lubricant from the slot on the inbound side to the slot on the outbound side.

EDWIN S. PEARCE.